March 1, 1955 H. C. ABRAMSON 2,703,241

SOUND RECORD

Original Filed Jan. 13, 1950 2 Sheets-Sheet 1

INVENTOR
HERBERT C. ABRAMSON
BY
Van Deventer & Shively
ATTORNEYS

March 1, 1955 H. C. ABRAMSON 2,703,241

SOUND RECORD

Original Filed Jan. 13, 1950 2 Sheets-Sheet 2

INVENTOR
HERBERT C. ABRAMSON
BY
Van Deventer & Shively
ATTORNEYS 2,703,241

SOUND RECORD

Herbert C. Abramson, New York, N. Y.

Continuation of application Serial No. 138,351, January 13, 1950. This application July 3, 1952, Serial No. 297,075

5 Claims. (Cl. 274—42)

This invention relates to sound records and a method of make the same and is a continuation of the application Serial Number 138,351, filed on January 13th, 1950, now abandoned.

An object of the invention is to produce a sound record having a plurality of recordings thereon. These recordings are spaced apart at their beginnings and form separate recordings hereinafter termed "sound tracks" which are in spaced-apart, side-by-side relation on the record.

Another object is too produce a sound record as referred to in the preceding paragraph wherein said plurality of recordings terminate in a common sound track, the recordings in said common track forming a part of the subject matter recorded in any of the tracks entering said common track.

Another object is to provide a plurality of sound records to be played in sequence each having a plurality of sound tracks thereon, the individual sound tracks on each record being selected haphazardly, any complete series of said tracks so selected forming a story or the like.

Another object is to provide a series of records as described in the preceding paragraph in which all the sound tracks on the last record of the series terminate in a common track, the recording in said last track forming a proper ending for all of the subject matter recorded in the tracks entering said common track.

A further object is to provide a method of recording a plurality of songs or other subject matter on a plurality of records, each record having a plurality of sound tracks thereon.

A further object is to produce a set of records for use by children and others, wherein there are two records giving four recording surfaces, each surface having found sound tracks thereon. These sound tracks may be engaged haphazardly by the reproducer needle, and yet the four sets of tracks are so related that regardless of what track is engaged, a complete story is told when the records are played in sequence. Because of the method of producing the sound tracks, 4 records (8 recording surfaces) will give 256 different stories.

Other objects and advantages of the method and records made thereby will be apparent from the following specification. Once the inventive concept herein disclosed is understood, it will be obvious that any form of record blank can be used to practice this method, providing the blank has a recording surface upon which the sound tracks can be produced side-by-side. This method, therefore, contemplates the use of Edison-type cylindrical records; Berliner and other types of disc records; magnetic tape; film; and all other forms of records upon which multiple sound tracks can be recorded. Obviously any number of sound tracks can be recorded on a single surface, depending on the dimensions thereof.

Also, in the case of disc records, it is immaterial whether the sound tracks play from the outside of the record inwardly, or vice versa.

For the sake of illustrating a preferred way of practicing the method herein disclosed, and of illustrating records produced thereby, reference will be made to the ordinary disc record in common use, and the following specification discloses the method and records produced thereby used in the set of records above referred to.

Figures 1, 2, 3:
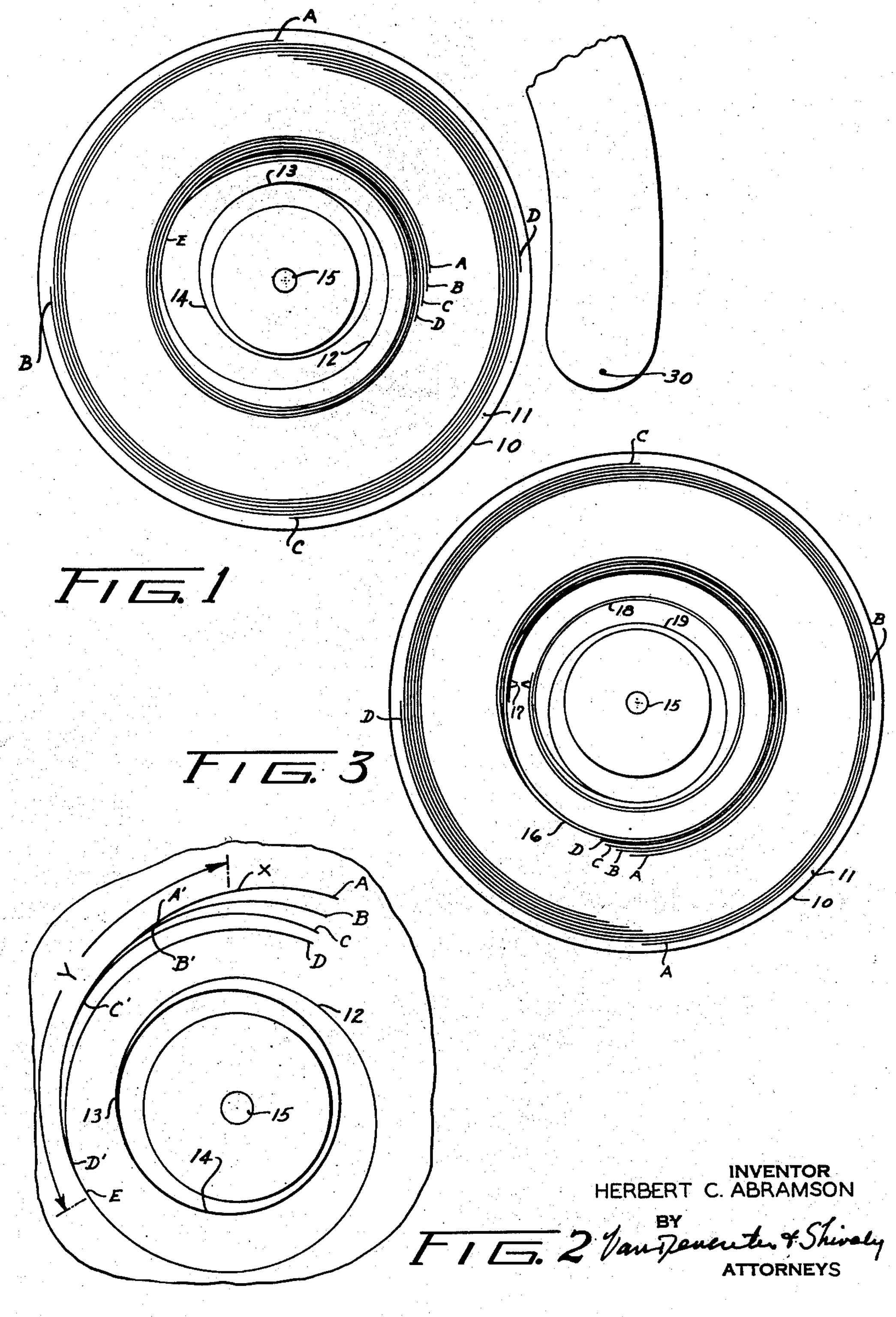
Figure 1 is a plan view of a disc record, the product of the method disclosed herein.
Figure 2 is a plan view, greatly enlarged, of a portion of the records Figures 1 and 2, showing how the sound tracks thereon join in a common track.
Figure 3 is a plan view of another record, the product of the method disclosed herein.

Referring to Figure 1, the numeral 10 denotes a record blank having thereon the sound tracks A, B, C, D. The beginnings of these tracks are, as shown, each independent, and all lie adjacent the smooth peripheral margin 11 of the record blank. The tracks A, B, C, D lie in parallel volute spirals (or side-by-side relationship) and finally terminate, as best seen in Figure 2, at $A_1$, $B_1$, $C_1$, $D_1$ respectively, in a common groove or track E, which extends in a spiral indicated at 12, which terminates at 13, in the circular groove or track 14, eccentrically disposed relative to the center 15 of the record blank.

The sound tracks are made in the record blanks in any suitable manner, as by machine engraving, using a conventional recorder. Where two record blanks are employed, the surfaces thereof will be designated as sides I, II, III and IV, respectively, and sides I, II and III will have the tracks A, B, C, D thereon as shown in Figure 1. The subject matter of the sound recording in these tracks will be referred to later.

Referring to Figure 3, which shows side IV of the series, the tracks A, B, C, D start as described in connection with Figure 1 but terminate at their inner points in a common sound track 16 which continues on toward the center of the record, covering the space 17 thereof, and this sound track terminates in a spiral groove or track 18 which terminates in the circular groove or track 19 eccentrically disposed relative to the center 15 of the record.

The circular eccentrically placed grooves 14 and 19 are for the purpose of oscillating the reproducer arm to operate the record changer mechanism of a phonograph in the usual manner.

The junction of the machine cut grooves in the records Figures 1 and 3 with the common track E or the track 16, and the connection of these common tracks with their respective circular grooves 14 and 17, will be best understood by reference to Figure 2.

The parallel volute spirals forming tracks A, B, C and D, are each recorded separately in the usual manner up to a point as near the common track E as possible. In the case of track A, Figure 1, this point would be at X, Figure 2, and the machine cutting of tracks B, C and D would also end somewhere in zone Y, Figure 2, which is greatly enlarged. The inner ends of the machine cut tracks are then preferably cut inwardly by hand or by moving the table by hand until said inner ends $A_1$, $B_1$, $C_1$, $D_1$ run into the common track E. The inner end of the tracks on the record Figure 3 are cut into the common track 16 in the same manner. All this, of course, applies to the making of a master record from which duplicates may be pressed as usual. The eccentric tracks and the final circular tracks may be machine cut as usual. The tracks may be 96 per inch on a 78-R. P. M. record, or any other spacing and record speed may be employed.

On tape and film the lateral spacing of the side-by-side tracks may be sufficient to eliminate interference and to permit shifting the translating or pick-up head to properly reproduce from each individual track.

To secure the advantages of this method as applied to a set of records, it is necessary to prepare a plot synopsis of the subject matter to be recorded. As an example, the following brief outline is given, the Roman numerals referring to the sides of the record blanks to be played in the order named, and the letters A, B, C, D referring to the sound tracks, four on each side:

PLOT SYNOPSIS

*The Ever-So-Many Amazing Adventures of Johnny Magic Record Album*

SIDE I

*Track A.*—Johnny hears strange sounds. Goes to seek its source. WANDERS AWAY FROM HOME.

*Track B.*—Johnny sees a rainbow. Vows to find the end of it. TRAVELS AWAY FROM HOME.

*Track C.*—Johnny sees pictures of circus clown in magazine. Clown invites him to join circus. To follow circus he STARTS ON JOURNEY FROM HOME.

*Track D.*—Johnny sees magician who promises him magic power if Johnny can find him. To find him Johnny STRAYS AWAY FROM HOME.

SIDE II

*Track A.*—AS JOHNNY IS WALKING ON HIS TRIP he meets a musician. Has adventure with him and continues onward. Hears a stranger say "Hello."

*Track B.*—AS JOHNNY IS WALKING ON HIS TRIP he meets a column of toy soldiers. Has adventure with them, goes off and hears a new voice greet him.

*Track C.*—AS JOHNNY IS WALKING ON HIS TRIP he finds candy store made of candy, has adventure, and continues on his way. Hears strange voice saying "Look who's here!".

*Track D.*—AS JOHNNY IS WALKING ON HIS TRIP he finds fruit salad tree. Has adventure, continues on. Hears someone greeting him.

SIDE III

*Track A.*—IT WAS A TURTLE. Has adventure with turtle. Is given a surprise package. Opens it.

*Track B.*—IT WAS A BIG BROWN BEAR. Has adventure and is given a surprise cake. Bites into it to find what is inside.

*Track C.*—IT WAS AN ELEPHANT. Has adventure and is given a surprise in a basket. Opens it to see contents.

*Track D.* —IT WAS A RABBIT. Has adventure with rabbit in which Johnny wins prize. He wonders what it is.

SIDE IV

*Track A.*—IT WAS A TOY ACCORDION, which opens into a stairway to the sky. He climbs up high and hears his mother calling him "Johnny, Johnny." (COMMON ENDING).

*Track B.*—IT WAS A PAIR OF BRIGHT RED SOCKS which make him take steps a mile long. As he is marching through space he hears voices calling "Johnny, Johnny." (COMMON ENDING).

*Track C.*—IT WAS SOME JUMPING BEANS. Swallows them. Johnny jumps along, hears voices "Look at Johnny, Johnny." (COMMON ENDING).

*Track D.*—IT WAS A NOTE WRITTEN IN GOLD which instructs Johnny where to find a kite. He holds on to kite and is swept into sky. Hears someone calling "Johnny, Johnny." (COMMON ENDING).

*Track 16.*—"Johnny, Johnny." It was his mother calling him. "Oh, Mother" he says, "I just dreamed about the most wonderful adventures, but I'm glad it was only a dream." He sings a song, "SAFE AT HOME." (COMMON ENDING).

Figure 4:
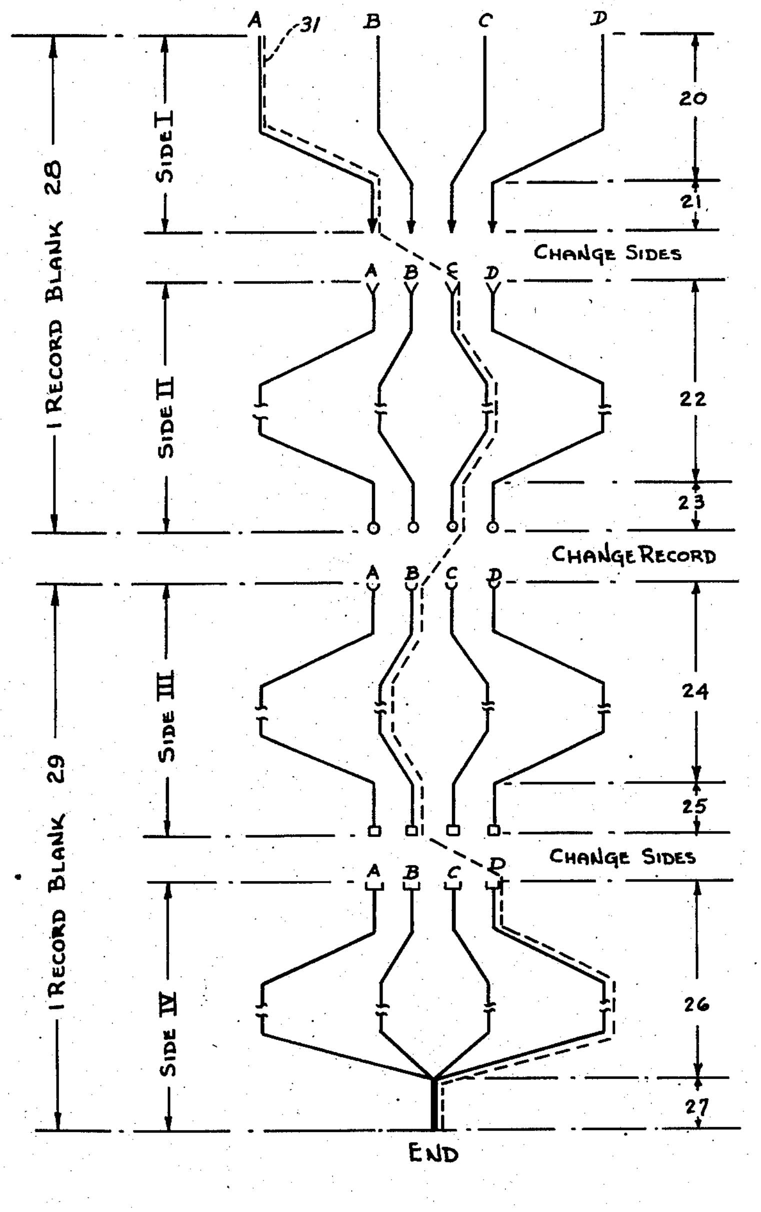
Figure 4 is a diagram illustrating the composition of and method of playing two record blanks having recordings thereon produced by the method herein disclosed.

The necessary steps in the production of such a synopsis as the foregoing and for the production of a recording script with which to practice the method herein disclosed will be apparent from a study of the chart, Figure 4, from which it will be apparent that the recording in all the sound tracks on Side I as indicated at 20 comprises a diverse idea for each track; viz.

A. Johnny hears strange sounds
B. Johnny sees a rainbow
C. Johnny sees pictures of circus clown
D. Johnny sees a magician and that (as indicated at 21) all the recordings assume an identity of plot action; viz.

A. Johnny wanders away from home
B. Johnny travels away from home
C. Johnny starts on a journey from home
D. Johnny strays away from home Sides II and III (or any number of sides between the first and last) are made up in the same manner as Side I, starting each track with a story that is a continuation of the ending of any story in any track on the preceding side.

Side II of the above synopsis will contain:

A. Johnny is walking on his trip—meets musician
B. Johnny is walking on his trip—meets soldiers C. Johnny is walking on his trip—finds candy store
D. Johnny is walking on his trip—finds tree The above, as indicated at 22, comprises a diverse idea for each track.

As indicated at 23, the recordings now assume an identity of plot action; viz.

A. Johnny hears a stranger say "Hello"
B. Johnny hears a new voice greet him
C. Johnny hears a strange voice say "Look who's here"
D. Johnny hears someone greeting him Side III may be like Side II, and each track starts with a story that is a continuation of the ending of any story in any track on the preceding side.

Side III of the above synopsis will contain:

A. It was a turtle
B. It was a bear
C. It was an elephant
D. It was a rabbit

The above is indicated at 24 and comprises a diverse idea for each track.

As indicated at 25 the recordings now assume an identity of plot action; viz.

A. Johnny opens surprise package
B. Johnny bites into cake
C. Johnny opens basket
D. Johnny wins prize.

Side IV may, for the sake of this specification, be regarded as the final side of the series. Here each track starts with a story that is a continuation of the ending of any story in any track on the preceding side, and each track will end in the common track of Figure 3, which continues on to the end of the recording.

Side IV of the above synopsis will contain:

A. It was a toy accordion * * * (then to track 16) "Johnny, Johnny"
B. It was a pair of bright red socks * * * (then to track 16) "Johnny, Johnny"
C. It was some jumping beans * * * (then to track 16) "Johnny, Johnny"
D. It was a note written in gold * * * (then to track 16) "Johnny, Johnny"

The above is indicated at 26 and comprises a diverse idea at the beginning of each track and a common ending for all said tracks.

The common track 16 may continue to deliver a common ending, such as:

"Johnny, Johnny!" It was his mother calling him. "Oh Mother," he says, "I just dreamed about the most wonderful adventures, but I'm glad it was only a dream." Sings song "SAFE AT HOME."

This common ending is indicated at 27, Figure 4.

In use, the records 28 and 29 are played in sequence but the selection of the sound tracks may be entirely haphazard. For example, a child may put the first record 28 on the phonograph with Side I in playing position; he starts the phonograph in the usual manner with the playback needle 30 resting on the clear space 11. As the record revolves, the needle 30 engages one of the tracks A, B, C, or D, quadrants of which are exposed and lie adjacent the space or starting groove 11 for the needle.

It will be noted that the start of each track is substantially equidistant from the center of the record blank. If the record plays from inside-out, then the starting zone 11 is of course near the center of the record.

The child does not know what track will be engaged and (unless the beginnings of the tracks are marked) cannot select any particular track. This lends suspense to the playing of the records and increases the interest and pleasure derived from playing same.

Assuming the needle using record 28 engaged track A on Side I, upon the termination of this recording, the child turns the record over and then haphazardly, as previously described, engages track C on Side II, then on record 29 haphazardly engages track C on Side III, and finally haphazardly engages track D on Side IV. The complete reproduction using all four sides is indicated by the dotted line 31, Figure 4.

Analysis of the chart, Figure 4, will show that where A equals the number of recordings (sound tracks) per surface, and N equals the number of surfaces (sides), then the possible different combinations X of tracks is:

$$X = A_1, A_2, A_3, A_4 \ldots A_N$$

It will be noted that the desirable effect of having a multiple number of stories available, the selection of any one of which is a matter of chance, is attained by any multiple groove record recorded as described herein in connection with Side IV of record 29. If four tracks are employed, a child would have four different stories, all having a common ending in the common track indicated at 27, Figure 4, said common track being the fifth track on said record.

It will also be noted that by ending the multiple grooves, A, B, C, and D in a common groove eccentrically placed on the record, that records made in accordance with this specification will operate record changer mechanisms where such eccentrically placed grooves are used to move the pick-up arm to actuate the record-change mechanism.

Obviously the needle 30 when playing the records, may drift in towards the center over space 11 and encounter any one of the tracks A, B, C, D. A child can therefore be instructed as follows:

"Play Sides I, II, III, IV, one after the other. When you want to hear a new story, just play the records all over again from the beginning, and then just like magic, you will hear a brand new exciting adventure of Johnny."

In the case of sound tracks recorded on magnetic tape or photographically on film, it will be understood that said tracks are produced in side-by-side relationship longitudinally of the tape or film, and subject matter such as that herein described is recorded and reproduced in any suitable manner, the recording medium and the translating mechanism being relatively movable transverse of the record to permit any one of the linear tracks on said record to be used.

What is claimed is:

1. A sound record having an axis about which said record is revolvable, said record having thereon a plurality of sound tracks each track beginning at a point substantially equidistant from the axis of the record, each of said tracks being continuous and spaced apart from the other tracks, all said tracks terminating in a common track.

2. A sound record having a plurality of spaced apart sound tracks thereon in side-by-side relation, each of said tracks having an independent starting point and all said tracks terminating in a common track.

3. A sound record comprising a flat disc having a plurality of sound tracks thereon in parallel volute spirals, each of said tracks having an independent starting point, and a common track in which all said sound tracks terminate, said common track terminating in a circular groove eccentrically disposed relative to the centre of said disc.

4. A sound record comprising a flat disc having a plurality of sound tracks thereon in parallel volute spirals, each of said tracks having an independent starting point, a common track in which all said sound tracks terminate, said common track continuing as a volute spiral and a circular groove communicating with said common track and eccentrically disposed relative to the centre of said disc.

5. A record album of the class described comprising a plurality of records to be used in a predetermined sequence, each record having a plurality of sound tracks on each side thereof, said tracks on each of all sides except the final side of the last record terminating in a common spiral groove or track, each of said spiral tracks terminating in a circular groove or track; said final side of said last record having a plurality of sound tracks thereon terminating in a common sound track, said last track terminating in a spiral groove or track, said last track terminating in a circular groove or track.

UNITED STATES PATENTS

References Cited in the file of this patent

| | | |
|---|---|---|
| 936,976 | Berliner | Oct. 12, 1909 |
| 2,309,276 | Roberts | Jan. 26, 1943 |